United States Patent [19]

Ethier

[11] Patent Number: 4,662,468
[45] Date of Patent: May 5, 1987

[54] SNOWMOBILE-MOTORCYCLE THREE-WHEEL VEHICLE

[76] Inventor: Pierre M. Ethier, 36 Des Castels, Lauzon, Quebec, Canada, G6V-2B7

[21] Appl. No.: 821,523

[22] Filed: Jan. 24, 1986

Related U.S. Application Data

[63] Continuation of Ser. No. 587,921, Mar. 9, 1984, abandoned.

[30] Foreign Application Priority Data

Mar. 21, 1983 [CA] Canada .................................. 424021

[51] Int. Cl.⁴ .............................................. B62D 27/04
[52] U.S. Cl. ..................... 180/215; 180/211
[58] Field of Search ............. 180/210, 211, 212, 213, 180/214, 215, 216, 217

[56] References Cited

U.S. PATENT DOCUMENTS

| | | | |
|---|---|---|---|
| 2,376,419 | 5/1945 | Cole | 180/43 |
| 3,016,967 | 1/1962 | Rehfeld | 180/30 |
| 3,738,440 | 6/1973 | Storm | 180/211 X |
| 3,776,353 | 12/1973 | Roth | 180/27 |
| 4,020,914 | 5/1977 | Trautwein | 180/210 |
| 4,195,702 | 12/1979 | Denis . | |
| 4,351,410 | 9/1982 | Townsend | 180/210 |
| 4,453,763 | 6/1984 | Richards | 180/215 X |

FOREIGN PATENT DOCUMENTS

| | | |
|---|---|---|
| 1056313 | 6/1979 | Canada . |
| 0124372 | of 0000 | European Pat. Off. . |
| 3109555 | 2/1983 | Fed. Rep. of Germany . |
| 723564 | 4/1932 | France . |
| 734245 | 10/1932 | France . |
| 815121 | 7/1937 | France . |
| 1166804 | 11/1958 | France . |
| 2534860 | 4/1984 | France . |
| 1561253 | 2/1980 | United Kingdom . |
| 2120184 | 11/1983 | United Kingdom . |

*Primary Examiner*—Harry Tanner
*Attorney, Agent, or Firm*—Larson and Taylor

[57] ABSTRACT

The present invention consists of a three-wheels vehicle having at the front, the engine and two driving and steering wheels, having only one free-wheeling and non steering rear-wheel, having a snowmobile or motorcycle type of seat, and having protection elements on each side of the driver and passenger legs to protect them against side collisions. Such a lay-out presents an outstanding set of advantages: low purchasing and operating costs with the ease of driving and parking of motorcycles, excellent traction in snow supporting a comparison with snowmobiles, and usable all year long while being relatively safe as for automobiles.

10 Claims, 2 Drawing Figures

FIGURE -1-
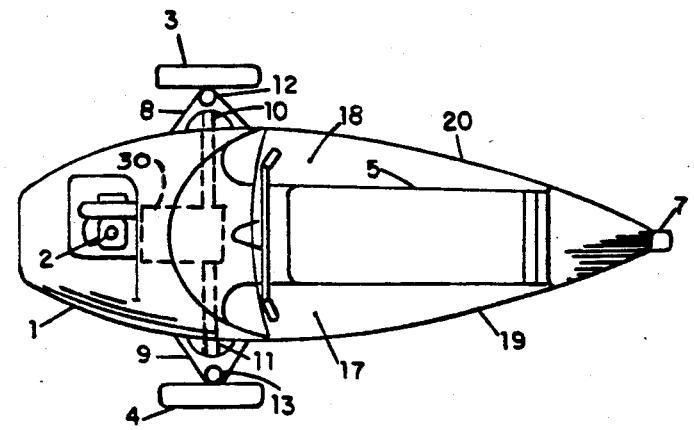
FIGURE -2-
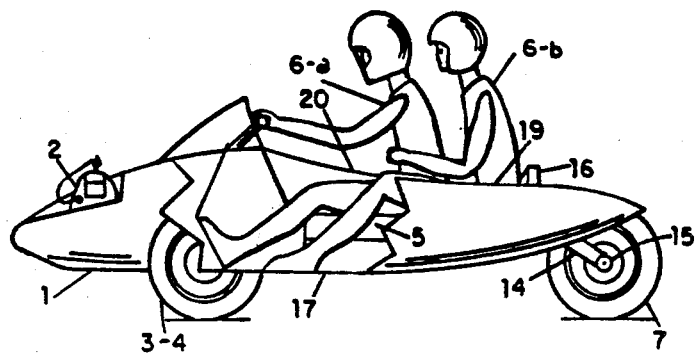

SNOWMOBILE-MOTORCYCLE THREE-WHEEL VEHICLE

This application is a continuation of application Ser. No. 587,921 filed Mar. 9, 1984, now abandoned.

BACKGROUND OF THE INVENTION

This invention relates to motorized three-wheel vehicles having a front engine, two driving and steering front wheels, and a single rear wheel.

Motorcycles offer little protection in frontal or lateral collisions. Furthermore, they can fall and harm their occupants when the tires slide, which constitutes a safety problem in summer and which blocks their usage in winter.

Snowmobiles cannot travel on roads during summer because of their skis. These may be replaced by two front wheels, and the endless track may be replaced by a rear wheel, but the results aren't very good. Either the two front wheels are steering wheels and the rear wheel is a driving wheel, but this does not provide much traction since most of the weight of the vehicle is on the two front wheels, or the two front wheels are driving wheels and the rear wheel is a steering wheel, but this does not steer very well since, again, most of the weight of the vehicle is on the two front wheels.

Conventional automobiles run all year long and offer protection to their occupants, but they are costly and they burn more fuel.

Three-wheel vehicles having a front engine, sitting their occupants one behind the other in tandem behind the engine, having two front driving and steering wheels, and having a single non-driving rear wheel, can also run all year long, offer protection to their occupants and still be cheaper to buy and to run than conventional automobiles. But they are costlier than motorcycles and snowmobiles because they have a full body structure equipped with seats, backrests and safety belts.

SUMMARY OF THE INVENTION

The creative idea consists in a three-wheel vehicle getting away from the idea of conventional automobiles and coming closer to the idea of motorcycles and snowmobiles without falling into the snowmobile modifications of the prior art.

This creative idea simply consists of a three-wheel vehicle having a front engine, two driving and steering front wheels, and a single rear wheel as previously described in the prior art, but having a seat without backrest or safety belts for the driver in order that the passenger may sit closer to the driver towards the front and even moreso since the driver may himself move to lean forward as he does on a motorcycle or snowmobile. Thus, the vehicle-occupants center of gravity may be moved forward and the passengers may voluntarily lean forward or to either side to keep the balance like on a snowmobile, in order to avoid rolling over in tight curves at high speeds and permit a narrower track of the two front wheels, which increases the driving and parking ease of the vehicle in urban traffic.

Although this very simple idea nearly seems obvious, it nevertheless leads to a novel vehicle lay-out which presents an outstanding set of useful characteristics.

(1) This novel three-wheels vehicle is a much safer means of transportation than motorcycles, because:

(a) the legs of the occupants are protected against lateral collisions by means of lateral protectors that may be made of robust steel tubes;

(b) the occupants sit in the middle of the vehicle and are thus also protected by the front wheels which will be first to be crushed in lateral or frontal-lateral collisions;

(c) there is no danger of sliding on slippery roads, so there is no danger of scratching or grazing the legs of the occupants that might have been caught in between the engine and the pavement in a slide;

(d) without the constant danger of sliding and losing control of the vehicle, the front brakes which are the most powerful, may be fully applied to reduce braking distances;

(e) with the engine at the front and with the possibility of installing a front bumper, the driver is farther behind the front of the vehicle to give him more chances against frontal collisions;

(f) being larger and capable of having a lighted headlight on each of the two front wheels, the vehicle may be more visible and more imposing for drivers of other vehicles;

(g) having the weight of the powertrain on the front wheels like front-drive four-wheels cars, the straight ahead stability is much better than for motorcycles which are highly sensitive to side-wind gusts;

(h) transporting a passenger is not a source of additional driving difficulty and additional accident risk as for motorcycles, but may instead be a source of increasing the stability of the vehicle as for conventional automobiles.

(2) And this novel three-wheel vehicle is much more functional than motorcycles, because:

(a) being a three-wheeler, it may be used all year long instead of less than half of the year as is typical of the northern section of North America;

(b) with the lateral protectors and the open cab, the passengers are not only better protected against water in pot-holes that get motorcyclists' shoes and pants wet and dirty, they are also better protected against cold mornings that slow down motorcyclists in spring and autumn, and they are even better protected against cold winter-mornings that freeze snowmobilers who are not protected by such lateral protectors;

(c) with around 75% of the weight of the vehicle-occupant system on the two front driving and steering wheels, driving and steering in snow are excellent and even better than for front-drive automobiles that only have 60% of their weight on their driving wheels, or even better than for front-engine rear-drive automobiles that only have around 40% of their weight on their driving wheels;

(d) with an open cab, the driver may stand-up and lean forward as he does on a snowmobile, to still increase the weight on the two front wheels in order, for instance, to counteract the weight transfer to the rear caused by a steep hill climb, and thus facilitate this hill climb in slippery conditions such as on snow;

(e) with an automatic transmission typical of snowmobiles and with an open cab which is half the width of conventional automobiles, the vehicle is easier to pull-out when stalled in snow since it is easier to remove the snow under the vehicle, since the occupants can also stand up and jump on the seat to compress the snow that supports the vehicle and eliminates the wheel traction, since the occupants can jump out of the vehicle as for a snowmobile, and can push on the handlebar while actuating the manual accelerator to move the vehicle which is lighter to push than conventional automobiles, and since if it still won't go forward, the occupants may get off and lift the lightened rear end to swing it in the opposite direction as it is done with snowmobiles;

(f) instead of a passenger, it is easy to carry luggages, camping material, grocery bags or other useful objects, without having to add supports because everything can be retained by the closed-bottom and opened-top open cab;

(g) it is easily possible to fix a trailer tongue on the rear suspension arm to convert the vehicle into a small trailer in order, for instance, to attach this light trailer-vehicle behind the family car and carry luggages to a summer resort where it is easy to drive and park this sight-seeing type of vehicle which may be used to visit those overcrowded summer resorts;

(h) finally, this vehicle becomes a unique tool for road safety promoters, not to "exterminate" but at least decrease the mental and physical suffrances, the fabulous hospitalization costs, and the losses of physical abilities inflicted by motorcycle accidents, by means of all the safety potential inserted into a vehicle that's attractive by its novelty, its functional aspects and the freedom image projected by its open cab and which interests so many motorcyclists.

BRIEF DESCRIPTION OF THE DRAWINGS

Concerning the drawings which illustrate an embodiment of the invention,

FIG. 1 shows a plan view of said embodiment and

FIG. 2 shows a side view of said embodiment, of which a portion of the left side was omitted to better show the legs of the driver and passenger.

DESCRIPTION OF THE PREFERRED EMBODIMENTS

The embodiment illustrated in FIGS. 1 and 2 represents a vehicle having a chassis 1 supporting the engine 2 at the front, two front wheels 3 and 4, a seat 5 and a single rear wheel 7.

Furthermore, as illustrated in FIG. 1, the suspension elements 8 and 9, both of automobile double-A arms type, provide means for front wheels 3 and 4 to support said chassis 1 at the front. Transmission shafts 10 and 11 transmit motion from engine 2 via a transmission system, shown schematically at 30, to the two front wheels 3 and 4 to drive the vehicle forward or backward. And these two front wheels 3 and 4 may be turned to the right or left by means of more or less vertical pivots 12 and 13 in order to steer the vehicle on the ground. Thus, the two front wheels 3 and 4 are driving and steering the vehicle.

Also, as shown in FIG. 2, suspension arm 14 provides means for rear wheel 7 to support said chassis 1 at the rear. And this rear wheel 7 can only turn around its pivot 15 which is horizontal-transversal. Thus, said rear wheel 7 is non-driving and non-steering.

And as also illustrated in FIG. 2, driver 6a may slightly lean forward as on motorcycles and snowmobiles, and said driver 6a does not have any backrest or safety belt restraining him from leaning to each side or even more forward to keep the balance, and passenger 6b can sit closer forward since there is no backrest between him and driver 6a. This increases the ability to avoid roll-over in curves at high speeds, and permits a narrower track of the two front wheels 3 and 4 for increased ease of driving and parking in urban traffic.

Furthermore, as illustrated in FIGS. 1 and 2, seat 5 is a bench having its longitudinal axis in the front-rear axis of chassis 1. This seat 5 provides means for the driver 6a to sit more or less towards the rear, depending on how tall he is, which avoids the added complexity and cost of an adjustment mechanism similar to the ones used for front seats of conventional automobiles. And this seat 5 provides means for the passenger 6b to sit behind driver 6a, and includes a small backrest 16 at its rearmost portion.

Also, as further shown by FIGS. 1 and 2, chassis 1 comprises on each side of said seat 5, longitudinal footrests 17 and 18 above which two longitudinal spaces are formed to provide room for the legs of the driver 6a and of the passenger 6b, whatever their lengths are. Also, lateral protectors 19 and 20 may be added above said footrests 17 and 18 since driver 6a does not have to pull his legs out in order to stabilize the stopped vehicle as he does on a motorcycle. Thus, this embodiment of the invention forms a vehicle easily driven or parked in urban traffic because of its narrow width, having an excellent traction in snow while still being easily pushed away when stalled, providing safety to the occupants by the powertrain system at the front and by means of the lateral protectors, while still using little fuel and not being too costly.

While a precise embodiment of the invention has been shown and described, it is obvious that changes and modifications may be made without departing from this invention in its broader aspects. For instance, this three-wheel vehicle may be made more useful by addition of elements such as a higher windshield or even a roof, a more or less high backrest, better profiled and even incorporating a head rest or a rear safety roll-bar, or a seat better profiled like a saddle or having its rear section slightly hightened as on motorcycles.

The embodiments of the invention, for which exclusive rights of property and privilege are claimed are defined as follows:

1. A motorized three-wheel vehicle comprising:
a chassis, an engine power source and a transmission system supported by said chassis,
two front wheels and a sole rear wheel,
said chassis supported at the front by said front wheels and at the rear by said sole rear wheel,
said two front wheels being located essentially symmetrically on the right and left side of said chassis, and including steering means operated by the driver, for steering said front wheels,
said engine power source operatively connected to said transmission system, and said transmission system operatively connected to said front wheels to drive said front wheels, both of said engine power source and said transmission system located at the forward end of the vehicle,
a seating means located to the rear of said transmission system for supporting one or more persons along the front to rear center line of said vehicle by their straddling their legs towards the left and right of said seating means, footrests on each side of the seating means,
and wherein the center of gravity of the engine power source is located forwardly of the center of gravity of said two front wheels.

2. A motorized three-wheel vehicle according to claim 1, said engine power source located forwardly of said transmission system, and said transmission system located essentially between said two front wheels.

3. A motorized three-wheel vehicle according to claim 1 or claim 2, including vertically extending protectors extending upwardly from the outer side of the footrests to provide a space for leg room between the seat and the protectors.

4. A motorized three-wheel vehicle according to claim 3, said chassis comprising an essentially horizontal-lateral surface located on each side of the assembly which comprises said seating means, said surface forming said footrests.

5. A horizontal three-wheel vehicle according to claim 4, said seating means comprising a bench extending longitudinally along the front to rear center line of the vehicle and of sufficient length for receiving a driver and a passenger to sit in tandem.

6. A motorized three-wheel vehicle according to claim 5, said rear wheel having means restraining its motion essentially to up and down movement to provide suspension means and to permit rotation around an essentially horizontal lateral axis.

7. A motorized three-wheel vehicle according to claim 5, said seating means comprising a backrest at its rear end.

8. A motorized three-wheel vehicle according to claim 6, said seating means comprising a backrest at its rear end.

9. A motorized three-wheel vehicle according to claim 5, said seating means comprising a backrest at its rear end, and said protectors having a height approximately the same as the top of said seating means.

10. A motorized three-wheel vehicle according to claim 6, said seating means comprising a backrest at its rear end, and said protectors having a height approximately the same as the top of said seating means.

* * * * *